United States Patent
Chen et al.

(10) Patent No.: US 12,490,077 B2
(45) Date of Patent: Dec. 2, 2025

(54) STATUS EVENT HANDLING ASSOCIATED WITH A SESSION MANAGEMENT FUNCTION (SMF) NODE

(71) Applicant: Telefonaktiebolaget LM Ericsson (publ), Stockholm (SE)

(72) Inventors: Qian Chen, Mölndal (SE); Yunjie Lu, Shanghai (CN); Juying Gan, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 333 days.

(21) Appl. No.: 18/259,142

(22) PCT Filed: Jan. 21, 2022

(86) PCT No.: PCT/IB2022/050556
§ 371 (c)(1),
(2) Date: Jun. 23, 2023

(87) PCT Pub. No.: WO2022/157716
PCT Pub. Date: Jul. 28, 2022

(65) Prior Publication Data
US 2024/0080655 A1 Mar. 7, 2024

(30) Foreign Application Priority Data
Jan. 21, 2021 (WO) ................ PCT/CN2021/073112

(51) Int. Cl.
*H04W 8/18* (2009.01)
*H04W 48/12* (2009.01)

(52) U.S. Cl.
CPC ............. *H04W 8/18* (2013.01); *H04W 48/12* (2013.01)

(58) Field of Classification Search
CPC ....... H04W 8/18; H04W 48/12; H04W 76/22; H04W 76/19
See application file for complete search history.

(56) References Cited

U.S. PATENT DOCUMENTS

2020/0404106 A1* 12/2020 Belling .................... H04W 8/10
2021/0258831 A1* 8/2021 Belling ............... H04L 47/2441

FOREIGN PATENT DOCUMENTS

EP 3 764 672 A1 1/2021

OTHER PUBLICATIONS

International Search Report and Written Opinion dated Apr. 19, 2022 issued in PCT Application No. PCT/IB2022/050556 filed Jan. 21, 2022, consisting of 19 pages.
(Continued)

*Primary Examiner* — Christopher M Brandt
(74) *Attorney, Agent, or Firm* — Sonoda & Kobayashi Intellectual Property Law; Sarvajit S. Patil

(57) ABSTRACT

Apparatuses and methods for DDD status event handling with I-SMF improvement. In one embodiment, a session management function, SMF, node is provided. The SMF node includes processing circuitry configured to receive a subscription request to an event associated with the SMF node where the subscription request includes at least one of a packet detection rule, PDR, information and a Traffic Descriptor, and instruct a user plane function, UPF, node based at least on the subscription request.

9 Claims, 7 Drawing Sheets

(56) References Cited

OTHER PUBLICATIONS

3GPP TS 23.501 V16.7.0 (Dec. 2020) 3rd Generation Partnership Project; Technical Specification Group Services and System Aspects; System architecture for the 5G System (5GS); Stage 2 (Release 16), consisting of 450 pages.
3GPP TS 23.502 V16.7.1 (Jan. 2021) 3rd Generation Partnership Project; Technical Specification Group Services and System Aspects; Procedures for the 5G System (5GS); Stage 2 (Release 16), consisting of 603 pages.
3GPP TS 23.503 V16.7.0 (Dec. 2020) 3rd Generation Partnership Project; Technical Specification Group Services and System Aspects; Policy and charging control framework for the 5G System (5GS); Stage 2 (Release 16), consisting of 119 pages.
3GPP TS 29.244 V16.6.0 (Dec. 2020) 3rd Generation Partnership Project; Technical Specification Group Core Network and Terminals; Interface between the Control Plane and the User Plane Nodes; Stage 3 (Release 16), consisting of 318 pages.
3GPP TS 29.501 V17.0.0 (Dec. 2020) 3rd Generation Partnership Project; Technical Specification Group Core Network and Terminals; 5G System; Principles and Guidelines for Services Definition; Stage 3 (Release 17), consisting of 77 pages.
3GPP TS 29.508 V17.1.0 (Dec. 2020) 3rd Generation Partnership Project; Technical Specification Group Core Network and Terminals; 5G System; Session Management Event Exposure Service; Stage 3 (Release 17), consisting of 44 pages.

* cited by examiner

STATUS EVENT HANDLING ASSOCIATED WITH A SESSION MANAGEMENT FUNCTION (SMF) NODE

CROSS-REFERENCE TO RELATED APPLICATIONS

This application is a Submission Under 35 U.S.C. § 371 for U.S. National Stage Patent Application of International Application No.: PCT/IB2022/050556, filed Jan. 21, 2022 entitled "STATUS EVENT HANDLING ASSOCIATED WITH A SESSION MANAGEMENT FUNCTION (SMF) NODE," which claims priority to U. S. Provisional Application No.: PCT/CN2021/073112, filed Jan. 21, 2021, entitled "DDD STATUS EVENT HANDLING WITH I-SMF IMPROVEMENT," the entireties of both of which are incorporated herein by reference.

TECHNICAL FIELD

The present disclosure relates to wireless communication and in particular, methods and apparatuses for downlink data delivery (DDD) status event handling with intermediate-session management function (I-SMF) improvement.

BACKGROUND

The $3^{rd}$ Generation Partnership Project (3GPP) has specified event exposure from different network functions (NFs), including the access and mobility management function (AMF) and session management function (SMF). For example, in 3GPP stage 2, it has been considered in 3GPP Technical Specification (TS) 23.501 clause 5.20 and TS 23, 502 clause 4.15.

For the protocol/packet data unit (PDU) session with involvement of I-SMF and visiting-SMF (V-SMF), the handling for event Downlink Data Delivery Status (DDD status) and event Downlink Data Notification failure (DDN failure) is not clearly specified currently.

An application function (AF) may subscribe to a particular event in SMF or AMF, via network exposure function/unified data management (NEF/UDM), the AF may also provide information related to the event. For the DDD status and DDN failure events, it may relate to packets buffering and discarding in the user plane function (UPF) where the SMF may instruct the UPF to carry out the activity via a Packet Detection Rule (PDR).

SUMMARY

Some embodiments advantageously provide methods and apparatuses for DDD status event handling with I-SMF improvement.

In one embodiment, a session management function (SMF) node is configured to receive a subscription request to an event associated with the SMF node, the subscription request comprising packet detection rule (PDR) information; and/or instruct a user plane function (UPF) node based at least in part on the PDR information comprised in the subscription request and/or a local policy.

In one embodiment, a session management function (SMF) node is configured to include packet detection rule (PDR) information in a subscription request, the subscription request being for an event associated with a second SMF node; and/or send the subscription request comprising the PDR information to the second SMF node.

According to one aspect of the present disclosure, a session management function, SMF, node is provided. The SMF node includes processing circuitry configured to receive a subscription request to an event associated with the SMF node where the subscription request includes at least one of a packet detection rule, PDR, information and a Traffic Descriptor, and instruct a user plane function, UPF, node based at least on the subscription request.

According to one or more embodiments of this aspect, the processing circuitry is further configured to: when the subscription request includes the PDR information, determine a PDR for the UPF node based on the PDR information, and where the instructing of the UPF node includes instructing the UPF node to at least one of buffer packets and discard packets based at least on the PDR. According to one or more embodiments of this aspect, the subscription request is received from a second SMF node, and where the SMF node is an intermediate-SMF, I-SMF, node in communication with the second SMF node. According to one or more embodiments of this aspect, the PDR information in the subscription request indicates a PDR.

According to one or more embodiments of this aspect, the processing circuitry is further configured to when the subscription request includes the Traffic Descriptor, determine the PDR for the UPF node, and where the instructing of the UPF node includes instructing the UPF node to at least one of buffer packets and discard packets based at least on the PDR. According to one or more embodiments of this aspect, the subscription request is received from a second SMF node, and where the SMF node is an visiting-SMF, V-SMF, node in communication with the second SMF node.

According to one or more embodiments of this aspect, the Traffic Descriptor indicates a source of one of a downlink internet packet, IP, and Ethernet traffic associated with the subscription request. According to one or more embodiments of this aspect, the instructing of the UPF node includes instructing the UPF node to at least one of buffer packets and discard packets. According to one or more embodiments of this aspect, the subscription request is associated with a downlink data delivery, DDD, status event subscription and the event is a DDD status event.

According to another aspect of the present disclosure, a system is provided. The system includes a first session management function, SMF, node including processing circuitry that is configured to cause the first SMF to: include at least one of a packet detection rule, PDR, information and Traffic Descriptor in a subscription request where the subscription request is for an event associated with a second SMF node, and send the subscription request to the second SMF node. The system further includes the second SMF node that includes processing circuitry that is configured to cause the second SMF node to, receive the subscription request to the event where the subscription request includes at least one of the PDR information and the Traffic Descriptor, and instruct a user plane function, UPF, node to at least one of buffer packets and discard packets based at least on the subscription request.

According to one or more embodiments of this aspect, the processing circuitry of the second SMF node is configured to cause the second SMF node to, when the subscription request includes the PDR information, determine a PDR for the UPF node based on the PDR information, and where the instructing of the UPF node includes instructing the UPF node to at least one of buffer packets and discard packets based at least on the PDR. According to one or more embodiments of this aspect, the second SMF node is an intermediate-SMF, I-SMF, node. According to one or more embodiments of this aspect, the PDR information in the subscription request indicates a PDR.

According to one or more embodiments of this aspect, the processing circuitry of the second SMF node is configured to cause the second SMF node to, when the subscription request includes the Traffic Descriptor, determine the PDR for the UPF node, and where the instructing of the UPF node includes instructing the UPF node to at least one of buffer packets and discard packets based at least on the PDR.

According to one or more embodiments of this aspect, the second SMF node is an visiting-SMF, V-SMF, node. According to one or more embodiments of this aspect, the Traffic Descriptor indicates a source of one of a downlink internet packet, IP, and Ethernet traffic associated with the subscription request. According to one or more embodiments of this aspect, the instructing of the UPF node by the second SMF node includes instructing the UPF node to at least one of buffer packets and discard packets. According to one or more embodiments of this aspect, the subscription request is associated with a downlink data delivery, DDD, status event subscription and the event is a DDD status event.

According to another aspect of the present disclosure, a method implemented by a session management function, SMF, node is provided. A subscription request to an event associated with the SMF node is received where the subscription request includes at least one of a packet detection rule, PDR, information and a Traffic Descriptor. A user plane function, UPF, node is instructed based at least on the subscription request.

According to one or more embodiments of this aspect, a PDR for the UPF node is determined based on the PDR information when the subscription request includes the PDR information. The instructing of the UPF node includes instructing the UPF node to at least one of buffer packets and discard packets based at least on the PDR. According to one or more embodiments of this aspect, the subscription request is received from a second SMF node, and where the SMF node is an intermediate-SMF, I-SMF, node in communication with the second SMF node.

According to one or more embodiments of this aspect, the PDR information in the subscription request indicates a PDR.

According to one or more embodiments of this aspect, when the subscription request includes the Traffic Descriptor, the PDR for the UPF node is determined, and where the instructing of the UPF node includes instructing the UPF node to at least one of buffer packets and discard packets based at least on the PDR. According to one or more embodiments of this aspect, the subscription request is received from a second SMF node, and where the SMF node is an visiting-SMF, V-SMF, node in communication with the second SMF node. According to one or more embodiments of this aspect, the Traffic Descriptor indicates a source of one of a downlink internet packet, IP, and Ethernet traffic associated with the subscription request.

According to one or more embodiments of this aspect, the instructing of the UPF node includes instructing the UPF node to at least one of buffer packets and discard packets. According to one or more embodiments of this aspect, the subscription request is associated with a downlink data delivery, DDD, status event subscription and the event is a DDD status event.

According to another aspect of the present disclosure, a method is provided. At least one of a packet detection rule, PDR, information and Traffic Descriptor is included in a subscription request where the subscription request is for an event associated with a second SMF node. The subscription request is send to the second SMF node. The subscription request to the event is received at the second SMF node where the subscription request including at least one of the PDR information and the Traffic Descriptor. A user plane function, UPF, node is instructed at the second SMF node to at least one of buffer packets and discard packets based at least on the subscription request.

According to one or more embodiments of this aspect, when the subscription request includes the PDR information, determining, at the second SMF node, a PDR for the UPF node based on the PDR information, and where the instructing of the UPF node includes instructing the UPF node to at least one of buffer packets and discard packets based at least on the PDR. According to one or more embodiments of this aspect, the second SMF node is an intermediate-SMF, I-SMF, node. According to one or more embodiments of this aspect, the PDR information in the subscription request indicates a PDR.

According to one or more embodiments of this aspect, when the subscription request includes the Traffic Descriptor, the PDR for the UPF node is determined at the second SMF node, where the instructing of the UPF node includes instructing the UPF node to at least one of buffer packets and discard packets based at least on the PDR. According to one or more embodiments of this aspect, the second SMF node is an visiting-SMF, V-SMF, node. According to one or more embodiments of this aspect, the Traffic Descriptor indicates a source of one of a downlink internet packet, IP, and Ethernet traffic associated with the subscription request.

According to one or more embodiments of this aspect, the instructing of the UPF node by the second SMF node includes instructing the UPF node to at least one of buffer packets and discard packets. According to one or more embodiments of this aspect, the subscription request is associated with a downlink data delivery, DDD, status event subscription and the event is a DDD status event.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
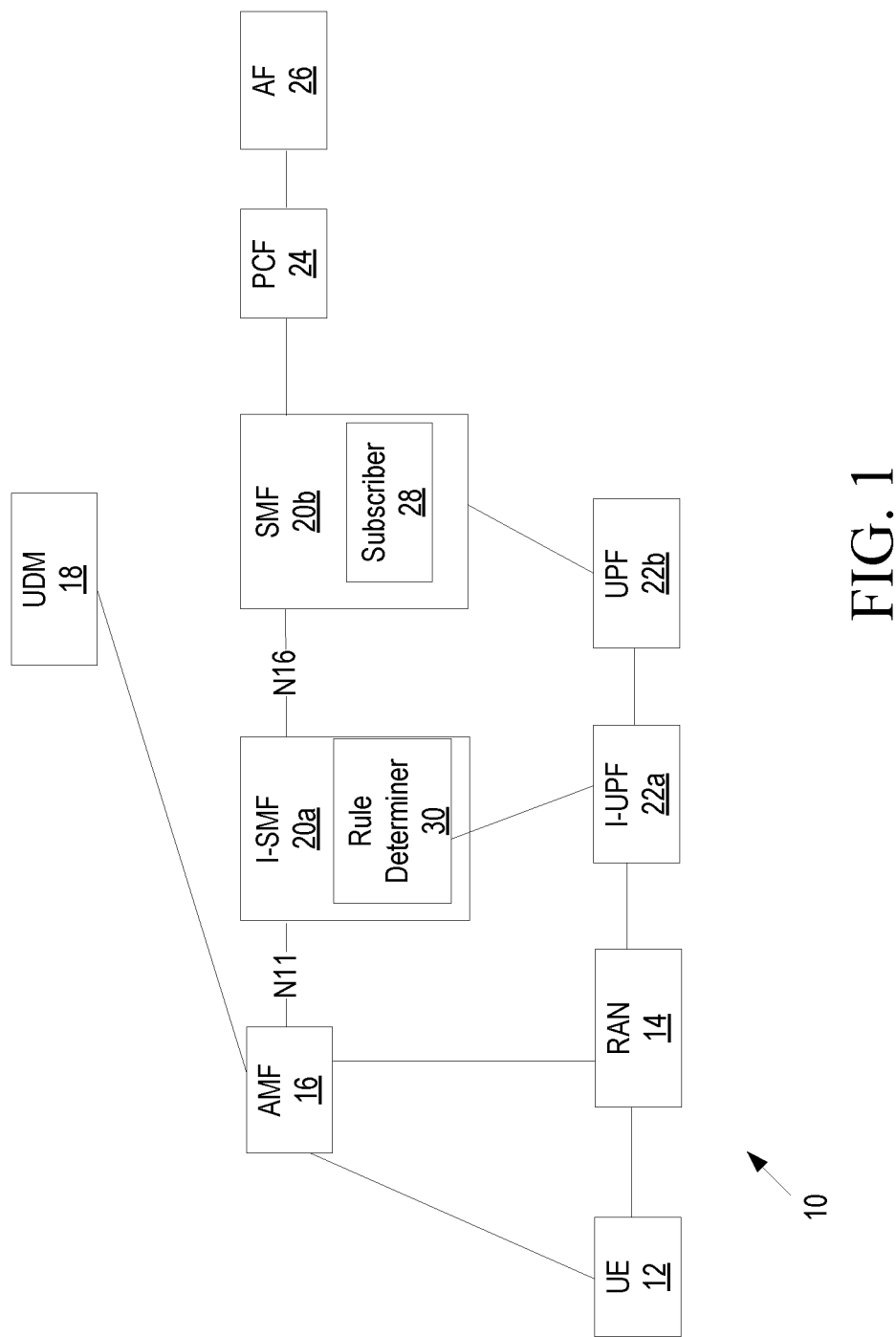
FIG. 1 illustrates an example system architecture according to some embodiments of the present disclosure.

As described above, an AF may subscribe to a particular event in SMF or AMF, via network exposure function/unified data management (NEF/UDM), the AF may also provide information related to the event. For the DDD status and DDN failure events, such information may relate to packets buffering and discarding in the UPF where the SMF may instruct the UPF to carry out the activity via a PDR.

When an I-SMF/I-UPF is involved (e.g., AF subscribes to I-SMF. etc.), the above packets handling may be performed in the I-UPF and the I-SMF may formulate the PDR.

However, there is no clear description currently as to how the I-SMF may formulate/determine the PDR.

Some embodiments of the present disclosure may propose at least two different arrangements for the I-SMF to formulate/determine the PDR.

In one embodiment, when the AMF (from e.g., a DDN failure event) or the SMF (for e.g., DDN status event) subscribes to the events in an I-SMF, the I-SMF, based on a local configuration, may either determine the PDR locally or based on the "PDR information" provided from the SMF to the I-SMF.

Some embodiments may advantageously allow the I-SMF to make decisions/determinations (e.g., about a PDR) on its own; without extra communications between the I-SMF and SMF before the PDR information retrieval from the SMF.

In one embodiment, when "PDR information" is provided from the SMF to the I-SMF for a DDN Status event, the SMF can provide the "PDR information" together when the SMF subscribes to the event in the I-SMF.

Some embodiments may advantageously provide optimization in the communication between the SMF and I-SMF in general.

Some embodiments may advantageously provide that, all the information (e.g., for the subscription and the PDR information) is provided from the SMF in one signaling (e.g., one message) instead of, for example, event subscription being one signaling and PDR information retrieval being another signaling.

Before describing in detail example embodiments, it is noted that the embodiments reside primarily in combinations of apparatus components and processing steps related to DDD status event handling with I-SMF improvement. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The UE herein can be any type of wireless device capable of communicating with a network node or another UE over radio signals. In some embodiments, the UE may be an autonomous machine configured to communicate via IMS. The UE herein can by any type of communication device capable of communicating with another UE, an application server, a network node, a server, an IMS NF or other IMS network node, via a wired connection and/or a wireless connection. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "node" is used herein and can be any kind of network node, such as, a session management function node (e.g., SMF, I-SMF, V-SMF, etc.), a user plane function (UPF) node, a Proxy-Call Session Control Function (P-CSCF) node, a mobility management node (e.g., Mobility Management Entity (MME) and/or Access and Mobility Function (AMF)), a gateway (e.g., access gateway), or any network node. In some embodiments, the network node may be, for example, a subscriber database node, a core network node, a Fifth Generation (5G) and/or New Radio (NR) network node, an Evolved Packet System (EPS) node, an Internet Protocol (IP) Multimedia Subsystem (IMS) node, a Network Function (NF) node, an Serving-CSCF node, an Interrogating-CSCF node, a network repository function (NRF) node, a unified data management (UDM) node, a Network Exposure Function (NEF) node, a home subscriber server (HSS) node, a home location register (HLR) node, etc.

A node may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node is said to be virtualized. A node may be associated with multiple physical components that may be located either in one location, or may be distributed across multiple locations.

In some embodiments, the term "local" may indicate a local policy that is local to the I-SMF node.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g., representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g., representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel. An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Note that although terminology from one particular wireless system, such as, for example, 3rd Generation Partnership Project (3GPP), Long Term Evolution (LTE), 5th Generation (5G) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by an SMF may be distributed over a plurality of SMFs. In other words, it is contemplated that the functions of the SMF/I-SMF described herein are not limited to performance by a single physical device and, in fact, can be distributed among several physical devices.

In one or more embodiments, Traffic Descriptor refers to packet filters that can be used to detect and classify the traffic, e.g. whether the packets are sent from/to a specific application server.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like elements are referred to by like reference numerals, there is shown in FIG. 1 a schematic diagram of the communication system 10, according to another embodiment, constructed in accordance with the principles of the present disclosure. The communication system 10 in FIG. 1 is a non-limiting example and other embodiments of the present disclosure may be implemented by one or more other systems and/or networks. Referring to FIG. 1, system 10 includes one or more UEs 12 (collectively referred to as, UE 12), a radio access network (RAN) 14 (e.g., 5G or NR RAN), which may provide radio access to the UE 12 and an AMF node 16, which may provide access and mobility management for the UE 12. The system 10 may further include a Home Subscriber Server/User Data Management (HSS/UDM) 18 (hereinafter UDM), which may provide a database of subscriber information. The system 10 may further includes one or more SMF nodes 20 (such as, I-SMF 20a and SMF 20b, collectively referred to as, SMF 20). The system 10 may include one or more UPF nodes 22 (such as, I-UPF 22a and UPF 22b, collectively referred to as, UPF 22). The system 10 may include a policy control function (PCF) node 24 and an application function (AF) node 26.

It should be noted that although two SMF nodes 20a and 20b and two UPF nodes 22a and 22b are shown in FIG. 1, the system 10 may include more or less SMF and UPF nodes than those shown. Further, although FIG. 1 illustrates a number of interfaces, the system 10 may include more or less interfaces than those shown.

The I-SMF node 20b includes a subscriber 28 configured to include packet detection rule (PDR) information in a subscription request, the subscription request being for an event associated with a second SMF node; and/or send the subscription request comprising the PDR information to the second SMF node.

The I-SMF node 20a includes a rule determiner 30 configured to receive a subscription request to an event associated with the SMF node, the subscription request comprising packet detection rule (PDR) information; and/or instruct a user plane function (UPF) node based at least in part on the PDR information comprised in the subscription request and/or a local policy.

Example implementations, in accordance with an embodiment, of the UE 12, the SMF 20 and a network node 32, discussed in the preceding paragraphs will now be described with reference to FIG. 2.

The UE 12 includes a communication interface 34, processing circuitry 36, and memory 38. The communication interface 34 may be configured to communicate with other elements in the system 10. In some embodiments, the communication interface 34 may be formed as or may include, for example, one or more radio frequency (RF) transmitters, one or more RF receivers, and/or one or more RF transceivers, and/or may be considered a radio interface. In some embodiments, the communication interface 34 may also include a wired interface.

The processing circuitry 36 may include one or more processors 40 and memory, such as, the memory 38. In particular, in addition to a traditional processor and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 12 may further include software stored internally in, for example, memory 38, or stored in external memory (e.g., database) accessible by the UE 12 via an external connection. The software may be executable by the processing circuitry 36. The processing circuitry 36 may be configured to control any of the methods and/or processes described herein and/or to cause such methods, and/or processes to be performed, e.g., by the UE 12. The memory 38 is configured to store data, programmatic software code and/or other information described herein. In some embodiments, the software may include instructions stored in memory 38 that, when executed by the processor 40, causes the processing circuitry 36 and/or configures the UE 12 to perform the processes described herein with respect to the UE 12.

The SMF/I-SMF 20 includes a communication interface 42, processing circuitry 44, and memory 46. The communication interface 42 may be configured to communicate with the other elements in the system 10. In some embodiments, the communication interface 42 may be formed as or may include, for example, one or more radio frequency (RF) transmitters, one or more RF receivers, and/or one or more RF transceivers, and/or may be considered a radio interface. In some embodiments, the communication interface 42 may also include a wired interface.

The processing circuitry 44 may include one or more processors 48 and memory, such as, the memory 46. In particular, in addition to a traditional processor and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) the memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the SMF 20 may further include software stored internally in, for example, memory 46, or stored in external memory (e.g., database) accessible by the SMF 20 via an external connection. The software may be executable by the processing circuitry 44. The processing circuitry 44 may be configured to control any of the methods and/or processes described herein and/or to cause such methods, and/or processes to be performed, e.g., by the SMF 20. The memory 46 is configured to store data, programmatic software code and/or other information described herein. In some embodiments, the software may include instructions stored in memory 46 that, when executed by the processor 48, subscriber 28 and/or rule determiner 30, causes the processing circuitry 44 and/or configures the SMF 20 to perform the processes described herein with respect to the SMF 20 (e.g., processes described with reference to FIGS. 3-4 and/or any of the other flowcharts).

The network node 32 includes a communication interface 50, processing circuitry 52, and memory 54. The communication interface 50 may be configured to communicate with the UE 12 and/or other elements in the system 10. In some embodiments, the communication interface 50 may be formed as or may include, for example, one or more radio frequency (RF) transmitters, one or more RF receivers, and/or one or more RF transceivers, and/or may be considered a radio interface. In some embodiments, the communication interface 50 may also include a wired interface.

The processing circuitry 52 may include one or more processors 56 and memory, such as, the memory 54. In particular, in addition to a traditional processor and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 56 may be configured to access (e.g., write to and/or read from) the memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 32 may further include software stored internally in, for example, memory 54, or stored in external memory (e.g., database) accessible by the network node 32 via an external connection. The software may be executable by the processing circuitry 52. The processing circuitry 52 may be configured to control any of the methods and/or processes described herein and/or to cause such methods, and/or processes to be performed, e.g., by the network node 32. The memory 54 is configured to store data, programmatic software code and/or other information described herein. In some embodiments, the software may include instructions stored in memory 54 that, when executed by the processor 56 and causes the processing circuitry 52 and/or configures the network node 32 to perform the processes described herein with respect to the network node 32.

Figure 2:
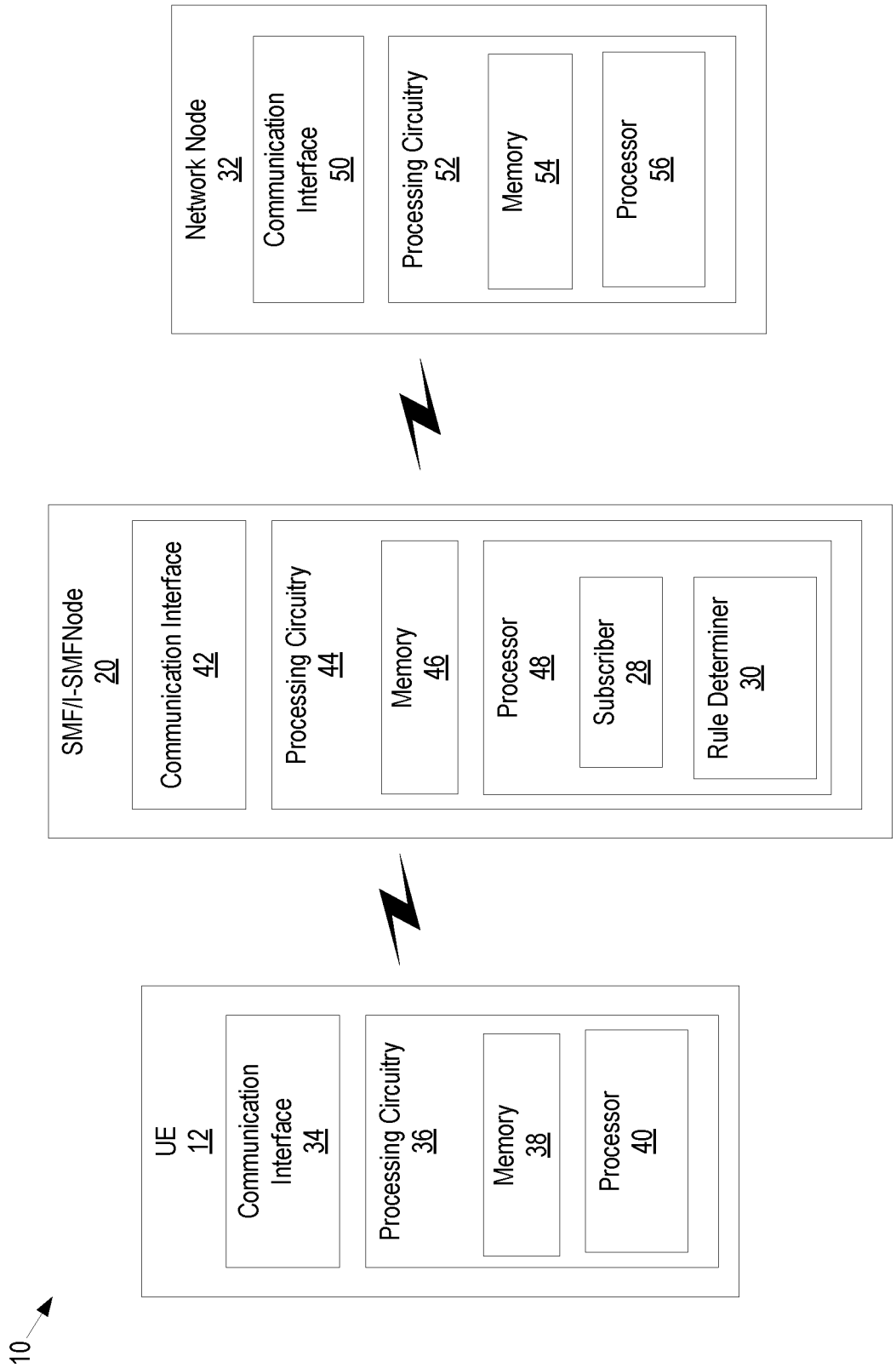
FIG. 2 illustrates another example system architecture according to some embodiments of the present disclosure.

In FIG. 2, the connection between the devices UE 12, SMF 20 and network node 32 is shown without explicit reference to any intermediary devices or connections. However, it should be understood that intermediary devices and/or connections may exist between these devices, although not explicitly shown.

Although FIG. 2 shows subscriber 28 and rule determiner 30, as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

Although FIG. 2 shows subscriber 28 and rule determiner 30 as being within a single SMF 20, it should be understood that, in some embodiments, a single SMF 20 may only include one of the subscriber 28 or rule determiner 30; and in other embodiments a single SMF may include both subscriber 28 and rule determiner 30 as shown in FIG. 2 (e.g., an SMF 20 may be an anchor SMF in some instances but an intermediate SMF in other instances and may therefore include the functionality associated with both cases).

Figure 3:
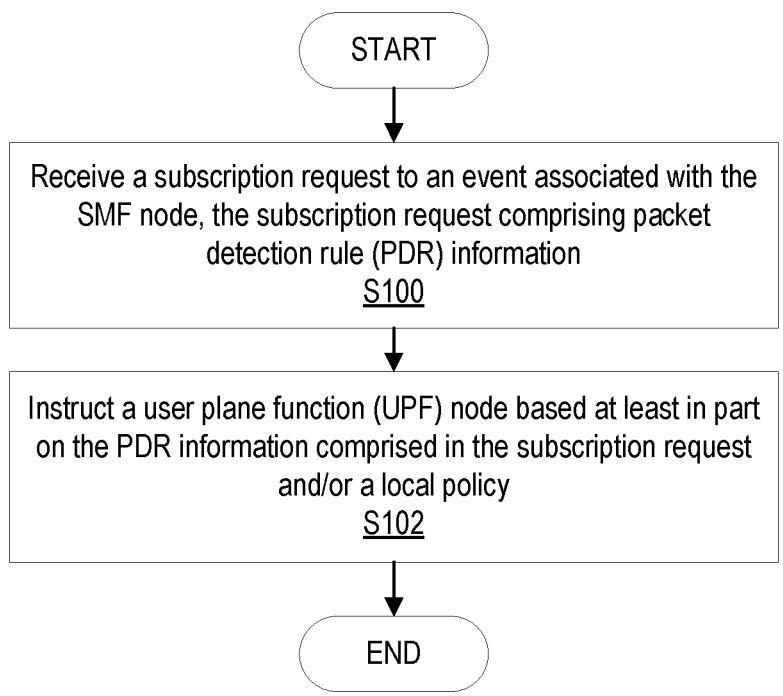
FIG. 3 is a flowchart of an example process in an SMF node according to some embodiments of the present disclosure.

FIG. 3 is a flowchart of an example process according to some embodiments of the present disclosure. One or more Blocks and/or functions and/or methods performed by the SMF 20 may be performed by one or more elements of SMF 20 such as by subscriber 28 and/or rule determiner 30 in processing circuitry 44, memory 46, processor 48, communication interface 42, etc. according to the example process/method. The example process includes receiving (Block S100), such as via subscriber 28 and/or rule determiner 30, processing circuitry 44, memory 46, processor 48 and/or communication interface 42, a subscription request to an event associated with the SMF node 20, the subscription request comprising packet detection rule (PDR) information. The method includes instructing (Block S102), such as via subscriber 28 and/or rule determiner 30, processing circuitry 44, memory 46, processor 48 and/or communication interface 42, a user plane function (UPF) node 22 based at least in part on the PDR information comprised in the subscription request and/or a local policy.

In some embodiments, instructing the UPF node 22 comprises, when the subscription request comprises the PDR information, determining, such as via subscriber 28 and/or rule determiner 30, processing circuitry 44, memory 46, processor 48 and/or communication interface 42, a PDR for the UPF node 22 based on the PDR information and when the subscription request lacks the PDR information, determining, by SMF node 20, the PDR for the UPF 22 based on the local policy.

In some embodiments, at least one of: the subscription request is received from at least one of a second SMF node 20 and an access and mobility management function (AMF) node 16; the SMF node 20 is an intermediate-SMF (I-SMF) node 20, the I-SMF node 20 being between the second SMF node 20 and the AMF node 16; instructing the UPF node 22 comprises instructing the UPF node 22 about packet buffering and packet discarding; and the event associated with the subscription request comprises at least one of an event related to a downlink data delivery (DDD) status event and an event related to a downlink data notification (DDN) failure event.

In some embodiments, the method further includes using, by SMF node 20, the received PDR information comprised in the subscription request to determine a PDR. In some embodiments, instructing the UPF node 22 comprises instructing, by SMF node 20, the UPF node 22 associated with the SMF node 20 based on the determined PDR and/or the local policy.

Figure 4:
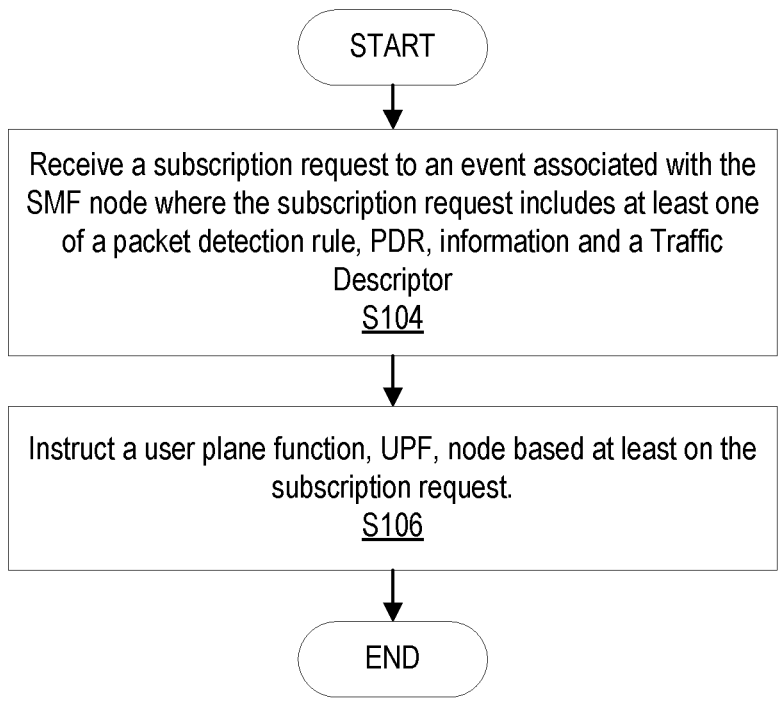
FIG. 4 is a flowchart of another example process in an SMF node according to some embodiments of the present disclosure.

FIG. 4 is a flowchart of an example process according to some embodiments of the present disclosure. One or more Blocks and/or functions and/or methods performed by the SMF 20 may be performed by one or more elements of SMF 20 such as by subscriber 28 and/or rule determiner 30 in processing circuitry 44, memory 46, processor 48, communication interface 42, etc. according to the example process/method. SMF node 20 is configured to receive (Block S104) a subscription request to an event associated with the SMF node where the subscription request includes at least one of a packet detection rule, PDR, information and a Traffic Descriptor. SMF node 20 is configured to instruct (Block S106) a user plane function, UPF, node 22 based at least on the subscription request. In one or more embodiments, Traffic Descriptor refers to packet filters that can be used to detect and classify the traffic, e.g. whether the packets are sent from/to a specific application server.

According to one or more embodiments, the processing circuitry 44 is further configured to: when the subscription request includes the PDR information, determine a PDR for the UPF node 22 based on the PDR information, and the instructing of the UPF node 22 includes instructing the UPF node 22 to at least one of buffer packets and discard packets based at least on the PDR. According to one or more embodiments, the subscription request is received from a second SMF node 20, and the SMF node 20 is an intermediate-SMF, I-SMF, node in communication with the second SMF node 20. According to one or more embodiments, the PDR information in the subscription request indicates a PDR.

According to one or more embodiments, the processing circuitry 44 is further configured to when the subscription request includes the Traffic Descriptor, determine the PDR for the UPF node 22, and where the instructing of the UPF node 22 includes instructing the UPF node 22 to at least one of buffer packets and discard packets based at least on the PDR. According to one or more embodiments, the subscription request is received from a second SMF node 20, and the SMF node 20 is an visiting-SMF, V-SMF, node in communication with the second SMF node 20.

According to one or more embodiments, the Traffic Descriptor indicates a source of one of a downlink internet packet, IP, and Ethernet traffic associated with the subscription request. According to one or more embodiments, the instructing of the UPF node 22 includes instructing the UPF node 22 to at least one of buffer packets and discard packets. According to one or more embodiments, the subscription request is associated with a downlink data delivery, DDD, status event subscription and the event is a DDD status event.

Figure 5:
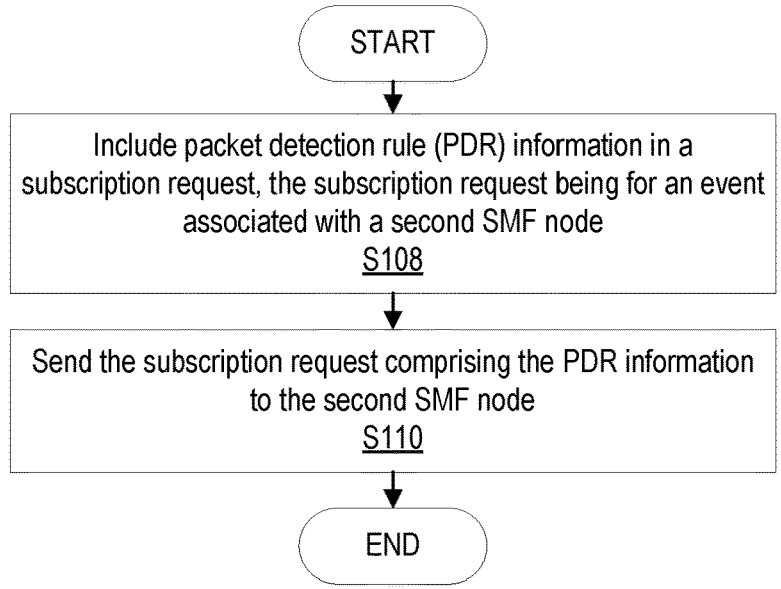
FIG. 5 is a flowchart of an example process in another SMF node according to some embodiments of the present disclosure.

FIG. 5 is a flowchart of an example process according to some embodiments of the present disclosure. One or more Blocks and/or functions and/or methods performed by the SMF node 20 may be performed by one or more elements of SMF node 20 such as by subscriber 28 and/or rule determiner 30 in processing circuitry 44, memory 46, processor 48, communication interface 42, etc. according to the example process/method. The example process includes including (Block S108), such as via subscriber 28 and/or rule determiner 30, processing circuitry 44, memory 46, processor 48 and/or communication interface 42, packet detection rule (PDR) information in a subscription request, the subscription request being for an event associated with a second SMF node 20. The method includes sending (Block S110), such as via subscriber 28 and/or rule determiner 30, processing circuitry 44, memory 46, processor 48 and/or communication interface 42, the subscription request comprising the PDR information to the second SMF node 20.

In some embodiments, the method further includes receiving, such as via subscriber 28 and/or rule determiner 30, processing circuitry 44, memory 46, processor 48 and/or communication interface 42, a PDR information request from the second SMF node 20, the inclusion of the PDR information in the subscription request being a result of the PDR information request. In some embodiments, a PDR for a user plane function (UPF) node 22 associated with the second SMF node 20 being based at least in part on the PDR information sent in the subscription request and/or a local policy at the second SMF node 20.

In some embodiments, when the subscription request lacks the PDR information, determining, such as via subscriber 28 and/or rule determiner 30, processing circuitry 44, memory 46, processor 48 and/or communication interface 42, that the PDR for the UPF node 22 is based on the local policy at the second SMF node 20. In some embodiments, at least one of: the second SMF node 20 is an intermediate-SMF (I-SMF) node 20, the second I-SMF node being between the SMF node 20 and an access and mobility management function (AMF) node 16; the PDR information being used to instruct the UPF node 22 about packet buffering and packet discarding; and the event associated with the subscription request comprises at least one of an event related to a downlink data delivery (DDD) status event and an event related to a downlink data notification (DDN) failure event.

Figure 6:
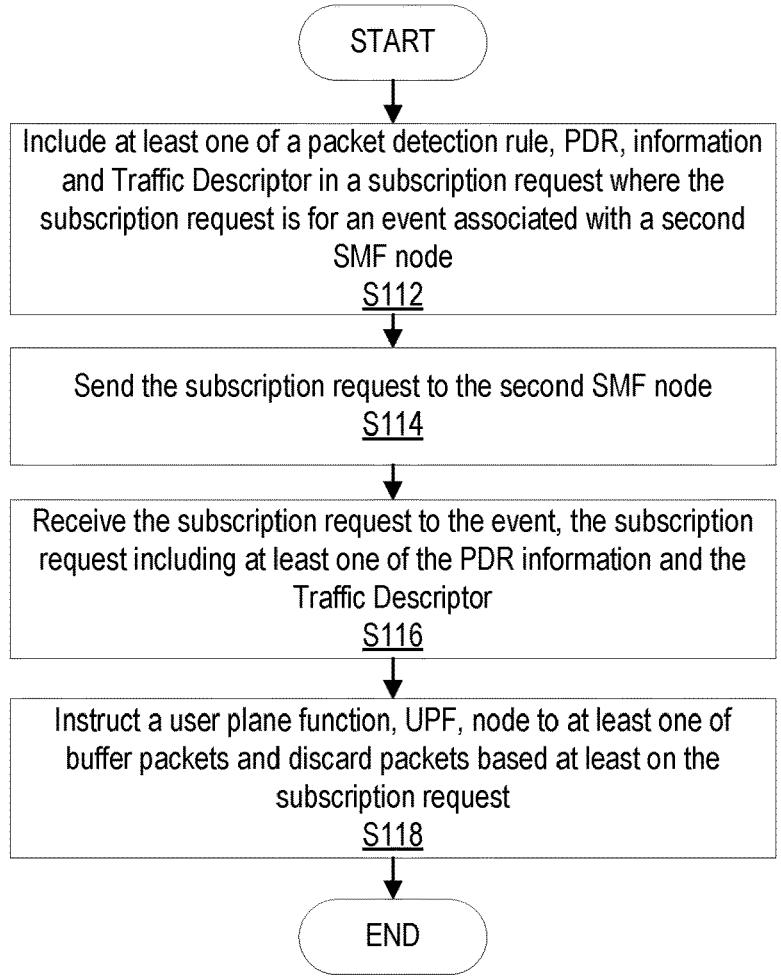
FIG. 6 is a flowchart of a system process according to some embodiments of the present disclosure.

FIG. 6 is a flowchart of an example process according to some embodiments of the present disclosure. One or more Blocks and/or functions and/or methods performed by one or more SMF nodes 20 may be performed by one or more elements of one or more SMF nodes 20 such as by subscriber 28 and/or rule determiner 30 in processing circuitry 44, memory 46, processor 48, communication interface 42, etc. according to the example process/method. A first SMF node 20 includes processing circuitry 44 that is configured to cause the first SMF to include (Block S112) at least one of a packet detection rule, PDR, information and Traffic Descriptor in a subscription request where the subscription request is for an event associated with a second SMF node 20. The processing circuitry 44 of the first SMF node 20 is configured to cause the first SMF node 20 to send (Block S114) the subscription request to the second SMF node 20. The second SMF node 20 includes processing circuitry 44 configured to cause the second SMF node 20 to receive (Block S116) the subscription request to the event where the subscription request includes at least one of the PDR information and the Traffic Descriptor. The processing circuitry 44 of the second SMF node 20 is configured to cause the second SMF node 20 to instruct (Block S118) a user plane function, UPF, node 22 to at least one of buffer packets and discard packets based at least on the subscription request.

According to one or more embodiments, the processing circuitry of the second SMF node 20 is configured to cause the second SMF node 20 to, when the subscription request includes the PDR information, determine a PDR for the UPF node 22 based on the PDR information, and the instructing of the UPF node 22 includes instructing the UPF node 22 to at least one of buffer packets and discard packets based at least on the PDR. According to one or more embodiments, the second SMF node 20 is an intermediate-SMF, I-SMF, node 20. According to one or more embodiments, the PDR information in the subscription request indicates a PDR.

According to one or more embodiments, the processing circuitry of the second SMF node 20 is configured to cause the second SMF node 20 to, when the subscription request includes the Traffic Descriptor, determine the PDR for the UPF node 22, and the instructing of the UPF node 22 includes instructing the UPF node 22 to at least one of buffer packets and discard packets based at least on the PDR. According to one or more embodiments, the second SMF node 20 is an visiting-SMF, V-SMF, node 20. According to one or more embodiments, the Traffic Descriptor indicates a source of one of a downlink internet packet, IP, and Ethernet traffic associated with the subscription request. According to one or more embodiments, the instructing of the UPF node 22 by the second SMF node 20 includes instructing the UPF node 22 to at least one of buffer packets and discard packets. According to one or more embodiments, the subscription request is associated with a downlink data delivery, DDD, status event subscription and the event is a DDD status event.

Having generally described arrangements for DDD status event handling with I-SMF improvement, a more detailed description of some of the embodiments are provided as follows with reference to FIGS. 7-9, and which may be implemented by UE 12, I-SMF 20*a* and/or SMF 20*b* and one or more of any of the network nodes (e.g., network node 32) described herein.

When policy control request triggers (PCRT) are supported for DDD Status event, the Anchor SMF (e.g., 20*b*) passes the PDR information for the policy and charging control (PCC) rules for packet detects to I-SMF (e.g., 20*a*), when the anchor SMF 20*b* subscribes to I-SMF 20*a* for DDD Status Event via N16a.

Figure 7:
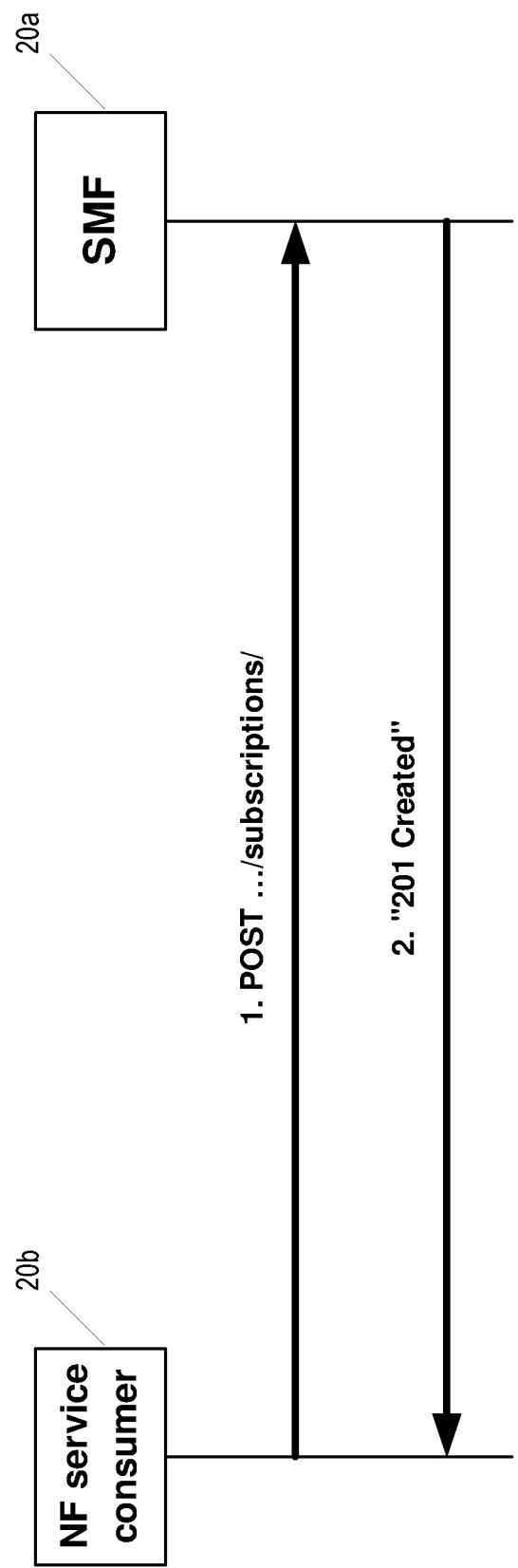
FIG. 7 is a flow diagram of an example process according to some embodiments of the present disclosure.

FIG. 7 illustrates an example of the creation of a subscription according to some embodiments of the present disclosure.

In FIG. 7, step 1, to subscribe to event notifications, the NF service consumer (e.g., SMF 20*b*) may send an HTTP POST request, to I-SMF 20*a* with: "{apiRoot}/nsmf-event-exposure/v1/subscriptions/" as Resource URI and the NsmfEventExposure data structure as request body that may include:
  if the subscription applies to events related to a single PDU session for a UE 12, the PDU Session ID of that PDU session as "pduSeId" attribute and the UE 12 identification as "supi" or "gpsi" attribute;
  if the subscription applies to events not related to a single PDU session, identification of UEs 12 to which the subscription applies via:
    a) identification of a single UE 12 by subscriber permanent identifier (SUPI) as "supi" attribute or GPSI as "gpsi" attribute;
    b) identification of a group of UE(s) 12 via a "groupId" attribute; or
    c) identification of any UE 12 via the "anyUeInd" attribute set to true;
  NOTE 1: The identification of any UE 12 does not apply for local breakout roaming scenarios where the SMF 20 is located in the VPLMN and the NF service consumer is located in the HPLMN.
    an URI where to receive the requested notifications as "notifUri" attribute;
    a Notification Correlation Identifier assigned by the NF service consumer for the requested notifications as "notifId" attribute; and
    if the NF service consumer is an AMF 16, the GUAMI encoded as "guami" attribute:
    a description of the subscribed events as "eventSubs" attribute that for each event may include:
      a) an event identifier as "event" attribute; and
      b) for event UP path change, whether the subscription is for early, late, or early and late notifications of UP path reconfiguration in the "dnaiChType" attribute;
    and that may include:
      a) for event "downlink data delivery status", the traffic descriptor(s) of the downlink data source in the "dddTraDescriptors" attribute (with PDR information in "pdrInfo" attribute per traffic descriptor, when an SMF, such as SMF 20*b*, subscribes to an I-SMF, such as SMF 20*a*);
      b) for event "downlink data delivery status", the subscribed delivery statuses in the "dddStati" attribute; and
      c) for event "QFI allocation", the application identifiers in the "appIds" attribute.

The NsmfEventExposure data structure as request body may also include:
  if the NF service consumer is an AMF 16:
    a) the name of a service produced by the AMF 16 that expects to receive the notification about subscribed events encoded as "serviceName" attribute;

b) Alternate or backup IPv4 Address(es) where to send Notifications encoded as "altNotifIpv4Addrs" attribute;
c) Alternate or backup IPv6 Address(es) where to send Notifications encoded as "altNotifIpv6Addrs" attribute;
d) Alternate or backup FQDN(s) where to send Notifications encoded as "altNotifFqdns" attribute;
A Data Network Name as "dnn" attribute;
A single Network Slice Selection Assistance Information as "snssai" attribute;
Immediate reporting flag as "ImmeRep" attribute;
event notification method (periodic, one time, on event detection) as "notifMethod" attribute;
Maximum Number of Reports as "maxReportNbr" attribute;
Monitoring Duration as "expiry" attribute;
Repetition Period for periodic reporting as "repPeriod" attribute;
sampling ratio as "sampRatio" attribute; and/or
group reporting guard time as "grpRepTime" attribute.

if the sampling ratio as the "sampRatio" attribute is included in the subscription, the SMF 20 may select a random subset of UEs 12 among target UEs 12 according to the sampling ratio and only report the event(s) related to the selected subset UEs 12; and When the group reporting guard time as the "grpRepTime" attribute is included in the subscription, the SMF 20 may accumulate all of the event reports for the target UEs 12 until the group reporting guard time expires. Then the SMF 20 may notify the NF service consumer using the Nsmf_EventExposure_Notify service operation.

If the SMF 20 received a globally unique AMF identifier (GUAMI), the SMF 20 may subscribe to GUAMI changes using the AMFStatusChange service operation of the Namf_Communication service, and it may use the Nnrf_NFDiscovery Service (using the obtained GUAMI and possibly service name) to query the other AMFs within the AMF set.

TABLE 1

Definitions of type EventSubscription.

| Attribute name | Data type | P | Cardinality | Description | Applicability |
|---|---|---|---|---|---|
| event | SmfEvent | M | 1 | Subscribed events | |
| dnaiChType | DnaiChangeType | C | 0 . . . 1 | For event UP path change, this attribute indicates whether the subscription is for early, late, or early and late DNAI change notification may be supplied. | |
| dddTraDescriptors | array(DddTrafficDescriptor) | C | 1 . . . N | The traffic descriptor(s) of the downlink data source. Shall be included for event "downlink data delivery status". | DownlinkDataDeliveryStatus |
| pdrInfo | array(PdrInfo) | O | 1 . . . N | The PDR informaiton per traffic descriptor of the downlink data source. May be included for event "downlink data delivery status" when Anchor SMF subscribe the event to I-SMF. | DownlinkDataDeliveryStatus |
| dddStati | array(DlDataDeliveryStatus) | O | 1 . . . N | May be included for event "downlink data delivery status". The subscribed statuses (discarded, transmitted, buffered) for the event. If omitted all statuses are subscribed. | DownlinkDataDeliveryStatus |
| appIds | array(ApplicationId) | O | 1 . . . N | May be included for event "QFI allocation". | QfiAllocation |

In FIG. 7, step 2, upon the reception of an HTTP POST request with: "{apiRoot}/nsmf-event-exposure/v1/subscriptions/" as Resource URI and NsmfEventExposure data structure as request body, the SMF (e.g., 20*a*) may:
create a new subscription;
assign a subscription correlation ID;
select an expiry time that is equal or less than a possible expiry time in the request;
store the subscription;
send a HTTP "201 Created" response with NsmfEventExposure data structure as response body and a Location header field containing the URI of the created individual subscription resource, i.e. {apiRoot}/nsmf-event-exposure/v1/subscriptions/{subId};
if the "ImmeRep" attribute is included and set to true in the request, the SMF 20 may report the current available value(s) for the subscribed event(s), for example as defined in subclause 4.2.3.1;

TABLE 2

Simple data types that may be supported.

| Type Name | Type Definition | Description | Applicability |
|---|---|---|---|
| SubId | string | Identifies an Individual SMF Notification Subscription. To enable that the value is used as part of a URI, the string may only contain characters allowed according to the "lower-with-hyphen" naming convention defined in 3GPP TS 29.501 [5]. In an OpenAPI [10] schema, the format may be designated as "SubId". | |
| PdrInfo | string | String with format "byte" as defined in OpenAPI Specification [15], i.e. base64-encoded characters, encoding | |

TABLE 2-continued

Simple data types that may be supported.

| Type Name | Type Definition | Description | Applicability |
|---|---|---|---|
| | | the Create PDR IE specified in 3GPP TS 29.244 [xx]. | |

Figure 8:
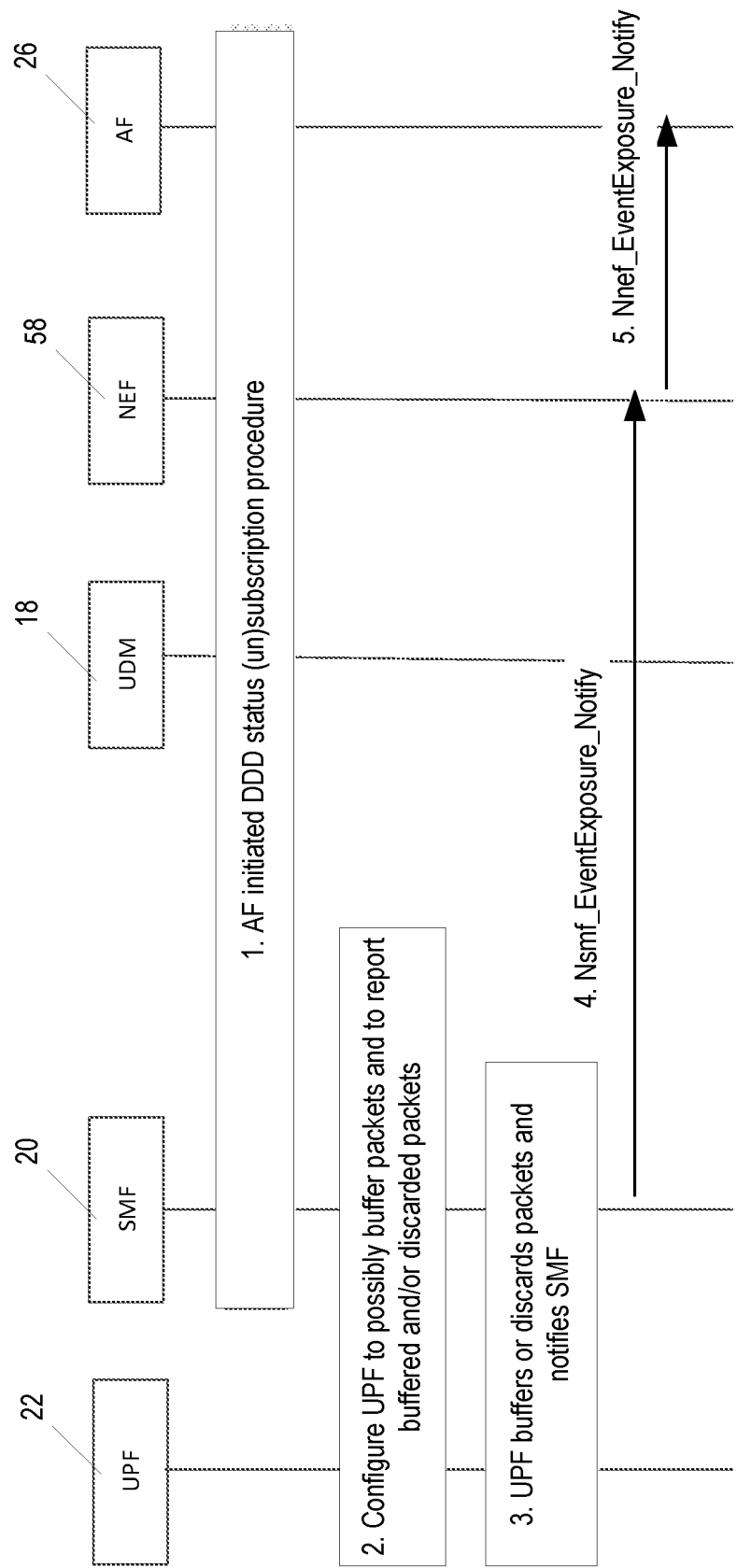
FIG. 8 is a flow diagram of another example process according to some embodiments of the present disclosure.

FIG. 8 illustrates an example of information flow for downlink data delivery status with UPF buffering.

The procedure may be used if the SMF 20 requests the UPF 22 to buffer packets. The procedure describes a mechanism for the Application Function (AF) 26 to subscribe to notifications about downlink data delivery status notification. The data delivery status notifications relates to high latency communication.

Cancelling may be done by sending Nnef_EventExposure_Unsubscribe request identifying the subscription to cancel with Subscription Correlation ID. Steps 2 to 5 are not applicable in the cancellation case.

FIG. 8 illustrates an example of Information flow for downlink data delivery status with UPF 22 buffering according to some embodiments of the present disclosure, such as in the following example steps:

1. AF interacts with NEF 58 to subscribe DDD status event in SMF 20.

In case of subscription cancelling and SMF 20 requested PCC rules from PCF 24 during event subscription, the SMF 20 reports to the PCF 24 for DDD status event unsubscribe. The PCF 24 removes the PCC rule and triggers the SMF 20 to remove the PDR rule from the UPF 22. In case of PDU session with I-SMF 20 or home-routed PDU session, the SMF 20 unsubscribe the DDD status event from IV-SMF 20 which in turn removes the PDR rules from the I/V-UPF 22.

2. If the UPF 22 is configured to apply extended buffering, step 2 is executed immediately after step 1. Otherwise, step 2 is executed when the SMF 20 is informed that the UE 12 is unreachable via a Namf_Communication_N1N2MessageTransfer service operation as described in clause 4.2.3, and the SMF 20 then also updates the PDR(s) for flows requiring extended buffering to requests the UPF 22 to buffer downlink packets. If the DDD status event with traffic descriptor has been received in the SMF 20 in step 1, if extended DL Data buffering in the UPF 22 applies, the SMF 20 provides the Traffic Descriptor in a PDR and requests the UPF 22 to report when there are corresponding buffered downlink packets or discarded packets in the UPF 22. If PCC is not used and there is no installed PDR with the exact same traffic descriptor, the SMF 20 copies the installed PDR that would have previously matched the incoming traffic described by the traffic descriptor in the notification subscription, but provides that traffic descriptor, a higher priority, and a buffer notification action within. If PCC is used and if "DDN Delivery Status event Subscribed with Traffic Descriptor" PCRT is provisioned during PDU session establishment or modification, the SMF 20 requests PCC Rules from the PCF 24 before contacting the UPF 22; the PCF 24 then provides PCC rule(s) taking into consideration the traffic descriptor for the subscribed DDD status event.

In the case of PDU session with I-SMF 20 or home-routed PDU session, the I/V-SMF 20 formulates the PDR rules.

In PDU session with I-SMF 20 case, based on local policy or the "DDD Status event Subscribed with Traffic Descriptor" PCRT from PCF 24, the SMF 20 may provide PDR information, which includes policy for detecting the corresponding buffered downlink packets or discarded packets at the UPF 22, to the I-SMF 20 during event subscription.

For home-routed PDU session or PDU session with I-SMF 20, steps 3-4 below are performed by V-SMF 20/V-UPF 22 or I-SMF/I-UPF 22.

3. The UPF 22 reports when there is buffered or discarded traffic matching the received PDR to the SMF 20. The SMF 20 detects that previously buffered packets can be transmitted by the fact that the related PDU session becomes ACTIVE.

4. The SMF 20 sends the Nsmf_EventExposure_Notify with Downlink Delivery Status event message to NEF 58.

5. The NEF 58 sends Nnef_EventExposure_Notify with Downlink Delivery Status event message to AF 26.

It has been considered that UDM 18 subscribes to AMF 16 for UE 12 availability after DDN failure event and UDM 18 subscribe to SMF 20 for Downlink Data Delivery Status event. If PCF 24 is used, SMF 20 notifies the PCF 24 the subscription to the 'Downlink data delivery status' and "DDN Failure" notifications with traffic descriptors, and the PCF 24 may then install or update suitable PCC rules with matching packet filters. However, it is not described how the I-SMF/V-SMF formulates the PDR rules in relation with SMF/PCF.

Figure 9:
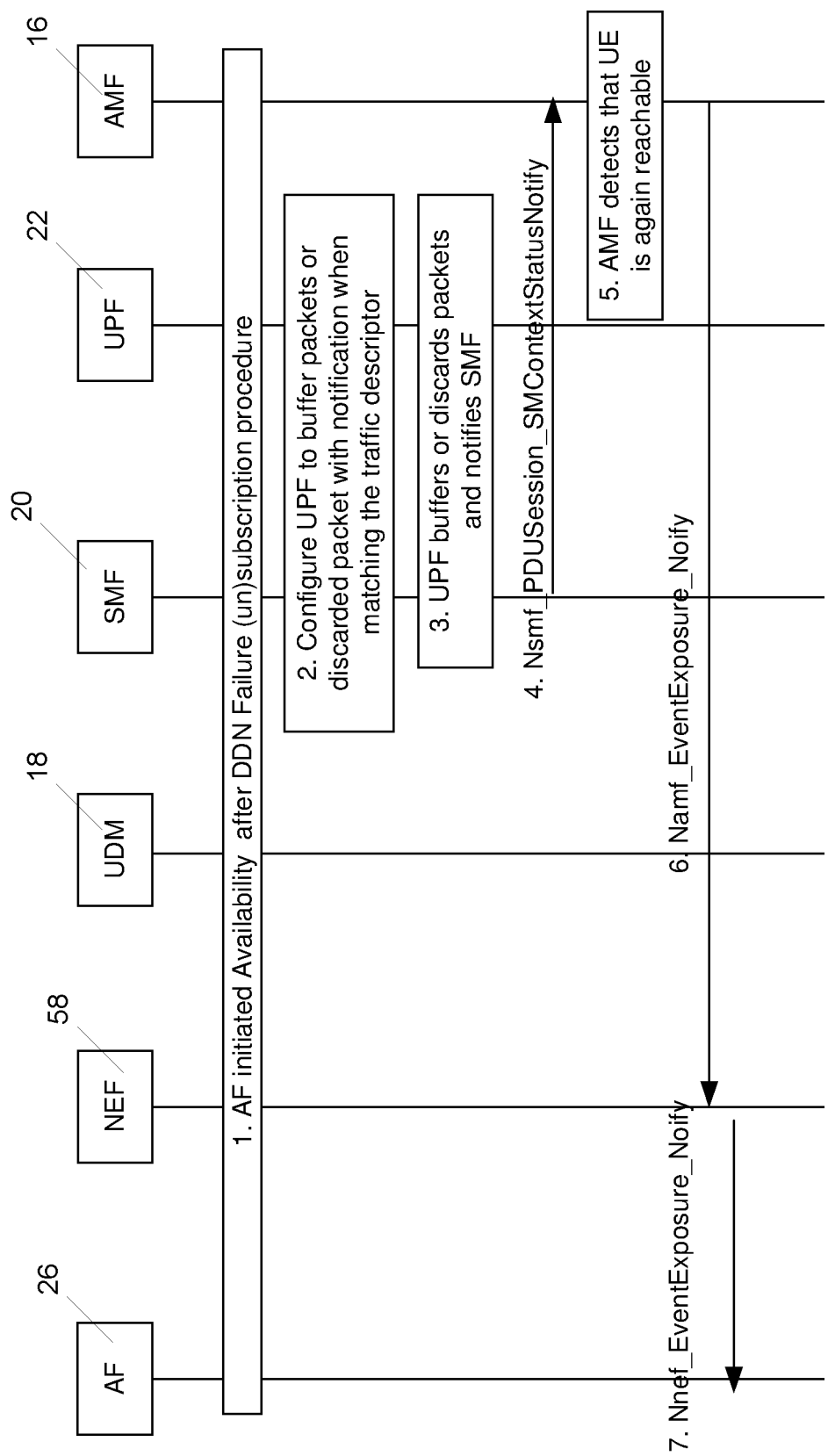
FIG. 9 is a flow diagram of yet another example process according to some embodiments of the present disclosure.

FIG. 9 illustrates an example of information flow for Availability after DDN Failure with UPF 22 buffering.

The procedure may be used if the SMF 20 requests the UPF 22 to buffer packets. The procedure describes a mechanism for the Application Function to subscribe to notifications about availability after DDN failure.

Cancelling is done by sending Nnef_EventExposure_Unsubscribe request identifying the subscription to cancel with Subscription Correlation ID. Steps 2 to 7 may not be applicable in the cancellation case.

FIG. 9 illustrates an example of Information flow for availability after DDN Failure event with UPF 22 buffering according to some embodiments of the present disclosure, such as in the following example steps:

1. AF 26 interacts with NEF 58 to subscribe availability after DDN failure event in AMF 16/SMF 20 as described in steps 0-8 of clause 4.15.3.2.7. In the case of PDU session with I-SMF 20, the SMF 20 may provide an indication when PDU session context is created in I-SMF 20 to request I-SMF 20 for PDR information retrieval from SMF 20 during DDN Failure event subscription (see step 2 below). The SMF 20 set the indication based on local policy or the "DDN Failure event Subscribed with Traffic Descriptor" PCRT from PCF 24.

In case of subscription cancelling from AMF 16 and SMF 20 requested PCC rules from PCF 24 during event subscription, the SMF 20 reports to the PCF 24 for DDN failure event unsubscribe. The PCF 24 removes the PCC rule and triggers the SMF 20 to remove the PDR rule from the UPF 22. In case of PDU session with I-SMF 20 or home-routed PDU session, The AMF 16 unsubscribe the DDN failure event towards I/V-SMF 20 and I/V-SMF 20 removes the PDR rule from I/V-UPF 22. In case of I-SMF 20 and the I-SMF 20 retrieved PDR information from SMF 20 during previous event subscription, the I-SMF 20 communicates with SMF 20 of the event cancelling before remove the PDR rule from I-UPF.

2. The SMF 20 provides the Traffic Descriptor in the PDR and requests the UPF 22 to report when there are corresponding downlink packets received in the UPF 22. If PCC is not used and there is no installed PDR with the exact same traffic descriptor, the SMF 20 copies the installed PDR that would have previously matched the incoming traffic described by the traffic descriptor in the notification subscription, but provides that traffic descriptor, a higher priority, and a buffer notification or drop notification action within, depending on whether the SMF 20 is aware of UE 12 being unreachable and if so what action the SMF 20 has indicated to the UPF 22.

If PCC is used and if "DDN Failure event Subscribed with Traffic Descriptor" PCRT is provisioned as defined in clause 6.1.3.5 of TS 23.503 during PDU session establishment or modification, the SMF 20 requests PCC Rules from the PCF 24 before contacting the UPF 22; the PCF 24 then provides PCC rule(s) taking into consideration the traffic descriptor for the subscribed DDN failure event.

In cases of PDU sessions with I-SMF 20 or home-routed PDU session, after receiving event subscription from AMF 16, the I/V-SMF 20 formulates the PDR rules and provides to I/V-UPF 22.

In cases of PDU sessions with I-SMF 20, based on local policy and the indication from SMF 20 in step 1 above, the I-SMF 20 may request PDR information which includes policy for detecting the corresponding buffered downlink packets or discarded packets at the UPF 22 from the SMF 20 before the I-SMF 20 contacts the I-UPF 22. The I-SMF 20 provides Traffic Descriptor to SMF 20 in the request for PDR information (via e.g., Nsmf_PDUSession_Update service operation).

For home-routed PDU session or PDU session with I-SMF 20, steps 3-4 below are performed by V-SMF 20/V-UPF 22 or I-SMF/I-UPF 22.

3-4. When a downlink packet is received in the UPF 22, if in step 2 the SMF 20 indicated drop notification to the UPF 22, the UPF 22 notifies the SMF 20 if the discarded DL data matches the traffic descriptor provided in step 2 and the SMF 20 reports the DDN Failure status with NEF 58 Correlation ID, by means of Nsmf_PDUSession_SMContextStatusNotify message, to the AMF 16 indicated as notification endpoint.

When downlink packet is received in the UPF 22, if in step 2 the SMF 20 indicated buffer notification to the UPF 22, the UPF 22 notifies the SMF 20 if the buffered packet matches the traffic descriptor provided in step 2, the SMF 20 initiates Network Triggered Service Request as specified in clause 4.2.3.3. If the AMF 16 responds Namf_Communication_N1N2MessageTransfer response with failure (e.g., due to UE 12 not reachable, or paging no response), in addition to what is specified in clause 4.2.3.3, the SMF 20 reports DDN Failure status with NEF 58 Correlation ID, by means of Nsmf_PDUSession_SMContextStatusNotify message, to the AMF 16 indicated as notification endpoint.

When the AMF 16 receives DDN Failure status from the SMF 20, the AMF 16 may set a Notify-on-available-after-DDN-failure flag corresponding to the Notification Correlation Id and the identifier of the UE 12 if available.

5-6. [Conditional] The AMF 16 detects the UE 12 is reachable and sends the event report(s) based on the Notify-on-available-after-DDN-failure flag, by means of Namf_EventExposure_Notify message(s), only to the NEF(s) 58 indicated as notification endpoint(s) identified via the corresponding subscription in step 1. In this way, only the AF(s) 26 for which DL traffic transmission failed are notified.

7. The NEF 58 sends Nnef_EventExposure_Notify message with the "Availability after DDN Failure" event to AF 26.

Although some example embodiments describe the SMF as subscribing to the I-SMF, some embodiments may include the AMF subscribing to the I-SMF according to some embodiments of the present disclosure.

SOME EXAMPLES

1. A method implemented in a session management function (SMF) node 20, the method comprising:

receiving (Block S100) a subscription request to an event associated with the SMF node 20, the subscription request comprising packet detection rule (PDR) information; and/or instructing (Block S102) a user plane function (UPF) node 22 based at least in part on the PDR information comprised in the subscription request and/or a local policy.

2. The method of Example 1, wherein instructing the UPF node 22 comprises, when the subscription request comprises the PDR information, determining a PDR for the UPF 22 based on the PDR information and when the subscription request lacks the PDR information, determining the PDR for the UPF 22 based on the local policy.

3. The method of any one of Examples 1 and 2, wherein at least one of:

the subscription request is received from at least one of a second SMF node 20 and an access and mobility management function (AMF) node 16;

the SMF node 20 is an intermediate-SMF (I-SMF) node, the I-SMF node being between the second SMF node 20 and the AMF node 16;

instructing the UPF node 22 comprises instructing the UPF node 22 about packet buffering and packet discarding; and the event associated with the subscription request comprises at least one of an event related to a downlink data delivery (DDD) status event and an event related to a downlink data notification (DDN) failure event.

4. The method of any one of Examples 1-3, further comprising using the received PDR information comprised in the subscription request to determine a PDR.

5. The method of Example 4, wherein instructing the UPF node 22 comprises instructing the UPF node 22 associated with the SMF node 20 based on the determined PDR and/or the local policy.

6. A method implemented in a session management function (SMF) node 20, the method comprising:

including (Block S104) packet detection rule (PDR) information in a subscription request, the subscription request being for an event associated with a second SMF node 20; and/or sending (Block S106) the subscription request comprising the PDR information to the second SMF node 20.

7. The method of Example 6, further comprising receiving a PDR information request from the second SMF node 20, the inclusion of the PDR information in the subscription request being a result of the PDR information request.

8. The method of any one of Examples 6 and 7, wherein a PDR for a user plane function (UPF) node 22 associated with the second SMF node 20 being based at least in part on the PDR information sent in the subscription request and/or a local policy at the second SMF node 20.

9. The method of Example 8, wherein when the subscription request lacks the PDR information, determining that the PDR for the UPF node 22 is based on the local policy at the second SMF node 20.

10. The method of any one of Examples 6-9, wherein at least one of:

The second SMF node 20 is an intermediate-SMF (I-SMF) node, the second I-SMF node 20 being between the SMF node 20 and an access and mobility management function (AMF) node 16;

the PDR information being used to instruct the UPF node 22 about packet buffering and packet discarding; and the event associated with the subscription request comprises at least one of an event related to a downlink data delivery (DDD) status event and an event related to a downlink data notification (DDN) failure event.

11. A network node 32 comprising processing circuitry 52, the processing circuitry 52 configured to cause the network node 32 to perform any of the methods of Examples 1-5.

12. A network node 32 comprising processing circuitry 52, the processing circuitry 52 configured to cause the network node 32 to perform any of the methods of Examples 6-10.

13. A system comprising:

a first session management function (SMF) node 20 comprising processing circuitry 44 and/or a communication interface 42, the processing circuitry 44 and/or the communication interface 42 configured to cause the first SMF node 20 to:

include packet detection rule (PDR) information in a subscription request, the subscription request being for an event associated with a second SMF node 20; and/or send the subscription request comprising the PDR information to the second SMF node 20; and the second SMF node 20 comprising processing circuitry 44 and/or a communication interface 42, the processing circuitry 44 and/or the communication interface 42 configured to cause the second SMF node 20 to:

receive the subscription request to the event, the subscription request comprising the PDR information; and/or instruct a user plane function (UPF) node 22 based at least in part on the PDR information comprised in the subscription request and/or a local policy.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, may be construed to constitute a complete written description of all combinations and subcombinations of the embodiments described herein, and of the manner and process of making and using them, and may support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A session management function, SMF, node behaving as an Intermediate SMF for a packet data unit, PDU, session, the SMF node comprising:
processing circuitry configured to:
receive, from a second SMF node, a subscription request associated to a Downlink Data Delivery, DDD, status event, the subscription request including packet detection rule, PDR, information or a Traffic Descriptor indicating a source of one of a downlink internet packet, IP, and Ethernet traffic associated with the subscription request;
determine a PDR for a user plane function, UPF, node based on the PDR information or the Traffic Descriptor; and
instruct a user plane function, UPF, node with the determined PDR.

2. The SMF node of claim 1, wherein the instructing of the UPF node includes instructing the UPF node to at least one of buffer packets and discard packets.

3. The SMF node of claim 1, wherein the subscription request is associated with a downlink data delivery, DDD, status event subscription and the event is a DDD status event.

4. A system comprising:
a first session management function, SMF, node comprising processing circuitry configured to cause the first SMF node to:
include a packet detection rule, PDR, information or a Traffic Descriptor indicating a source of one of a downlink internet packet, IP, and Ethernet traffic associated in a subscription request, the subscription request being for an event associated with a Downlink Data Delivery, DDD, status event; and
send the subscription request to a second SMF node; and
the second SMF node behaving as an Intermediate SMF for a packet data unit, PDU, session, the second SMF node comprising processing circuitry configured to cause the second SMF node to:
receive the subscription request to the event, the subscription request including the PDR information or the Traffic Descriptor;
determine a PDR for a user plane function, UPF, node based on the PDR information or the Traffic Descriptor; and
instruct a user plane function, UPF, node with the determined PDR.

5. The system of claim 4, wherein the instructing of the UPF node by the second SMF node includes instructing the UPF node to at least one of buffer packets and discard packets.

6. The system of claim 4, wherein the subscription request is associated with a downlink data delivery, DDD, status event subscription and the event is a DDD status event.

7. A method implemented by a session management function, SMF, node behaving as an Intermediate SMF for a packet data unit, PDU, session, the method comprising:
receiving, from a second SMF node, a subscription request associated to a Downlink Data Delivery, DDD, status event, the subscription request including packet detection rule, PDR, information or a Traffic Descriptor indicating a source of one of a downlink internet packet, IP, and Ethernet traffic associated with the subscription request;
determining a PDR for a user plane function, UPF, node based on the PDR information or the Traffic Descriptor; and
instructing a user plane function, UPF, node with the determined PDR.

8. The method of claim 7, wherein the instructing of the UPF node includes instructing the UPF node to at least one of buffer packets and discard packets.

9. The method of claim 7, wherein the subscription request is associated with a downlink data delivery, DDD, status event subscription and the event is a DDD status event.

* * * * *